Sept. 23, 1941.　　　H. L. BISHOP　　　2,256,921
MAKE-READY
Filed March 17, 1939
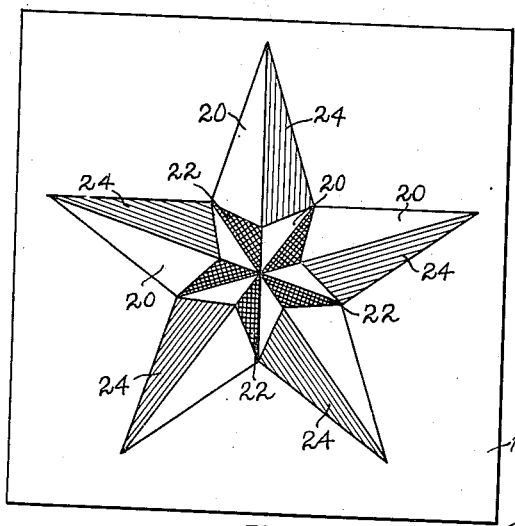
Fig. 3.
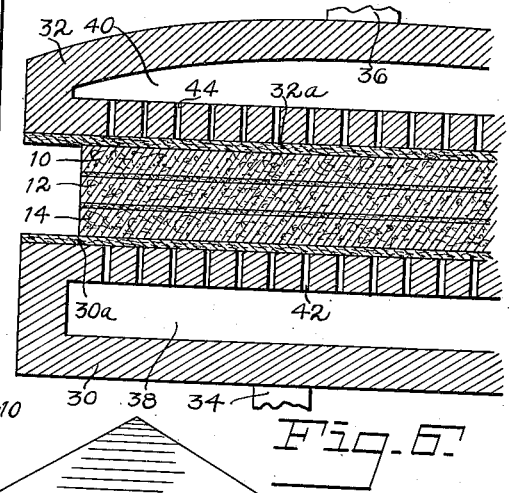
Fig. 6.
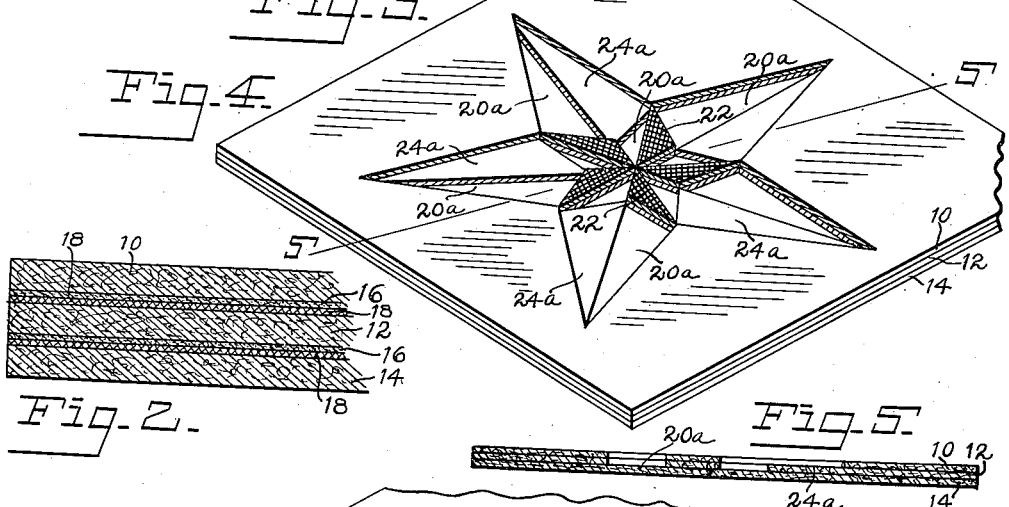
Fig. 4.
Fig. 2.
Fig. 5.
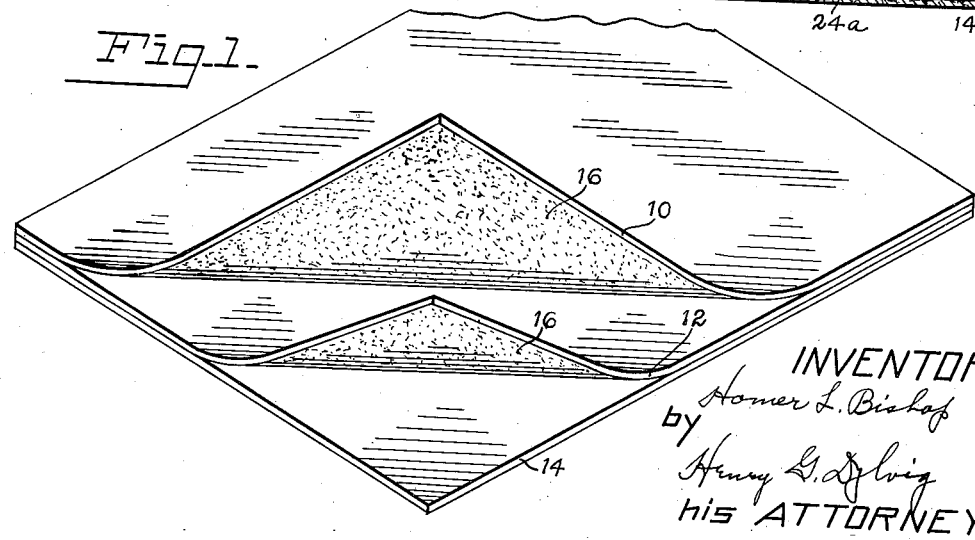
Fig. 1.
INVENTOR
Homer L. Bishop
by
Henry G. Sylvig
his ATTORNEY Patented Sept. 23, 1941

2,256,921

UNITED STATES PATENT OFFICE 2,256,921

MAKE-READY

Homer L. Bishop, Dayton, Ohio, assignor of one-half to Earl E. Stansell, Middletown, Ohio Application March 17, 1939, Serial No. 262,397

6 Claims. (Cl. 41—25.5)

This invention relates to laminated make-ready material, the process of producing, preparing and utilizing the same.

This invention is an improvement upon the make-ready disclosed in my Patent No. 2,088,398 dated July 27, 1937 for Printing process. In this patent the make-ready was produced by removing cut-out portions of the laminated structure bodily from the laminations. Such a mat made by this process produces an excellent make-ready for some uses.

The present invention utilizes a similar mat that is made from laminations held in position by a temporary bond permitting the bodily removal of cut-out pieces from the laminations. The mat made by bodily removing cut-out portions is then subjected to a treatment transferring the bond between the laminations from a temporary bond into a permanent bond.

An object of this invention is to produce a laminated make-ready from a laminated structure wherein the laminations are held together by a temporary bond while cutting out the make-ready and subsequently binding the laminations together into a permanent structure.

Another object of this invention is to provide a laminated structure having two types of binding material, the one a temporary binding material that fails more easily than the material of the laminations which permits the bodily removal of cut-out portions of the laminations, and the other a permanent binding material which is sufficiently strong to hold the laminations in a unitary structure while used as a make-ready.

Another object of this invention is to utilize a process of transferring the bond between laminations from a temporary bond into a permanent bond.

Another object of this invention is to produce a make-ready with a small amount of labor, from cheap materials, which make-ready is low in cost, but at the same time permanent and dependable.

Another object of this invention is to provide a laminated structure made from sheets of material, some of which have an inactive gummed surface arranged in such a manner that when cut-out portions are bodily removed from the structure, the surface thus exposed is not gummed.

Other objects and advantages reside in the construction of parts, the combination thereof and the mode of operation, as will become more apparent from the following description.

In the drawing, Figure 1 is a perspective view of a laminated assembly, showing the sheets partially separated.

Figure 2 is a cross sectional view of the laminated structure held in position by a temporary bond.

Figure 3 is a plan view showing an impression upon the face of the sheet, which impression has shaded lines representing various gradations of shading.

Figure 4 shows a perspective view of the laminated structure, having portions cut away, so as to produce a make-ready.

Figure 5 is a cross sectional view taken substantially on the line 5—5 of Figure 4.

Figure 6 is a cross sectional view showing the laminated mat in a bond transferring machine.

Prior to the development of the make-ready disclosed in my Patent No. 2,088,398, make-readies were usually made by cutting out pieces of paper of suitable dimensions and pasting or cementing these pieces of paper upon the make-ready base sheet. One or several such pieces were applied to the base sheet. Sometimes several thicknesses were required in order to build up sufficient padding. Such make-readies were slow to produce, expensive and usually very inaccurate, as a considerable amount of guesswork entered into the production of the make-ready.

This old type of make-ready has been replaced for many purposes by the make-ready disclosed in the above referred to patent. Furthermore, the make-ready disclosed in the above referred to patent has expanded the use of make-ready, in that a make-ready having the reverse thicknesses from the make-ready usually used upon packing cylinders is now being used extensively in face-treating electrotypes, that is, by virtually putting the make-ready into the face of the plate. By depressing the high light areas on the plate, the use of a make-ready upon the packing cylinder may be completely eliminated for some types of production. The make-ready disclosed in the above referred to patent has given excellent results when used for face-treating electrotypes.

When it comes to make-ready for use on packing cylinders, it receives a tremendous amount of abuse, in that it is used in making a great number of impressions, at times hundreds of thousands of impressions. For make-readies to be used on packing cylinders, it is necessary for the binding material holding the laminations together to be practically as strong as the lamination material itself, as a matter of fact, for a perfect make-ready, the binding material should be equally as strong, or stronger, than the material forming the sheets that are bound together. If the laminated structure from which the laminated sheet is to be made is provided with a binding material that is as strong as the sheet material, it would be impossible to remove cut-out portions in one sheet from the remaining structure.

In the present invention this problem has been overcome by providing a temporary bond for holding the laminated sheets together until the make-ready has been cut out, at which time the bond is transferred from a temporary bond into a permanent bond, that is, instead of the sheets being held together by a temporary bond, the sheets are held together by a permanent bond. This may be accomplished either by providing a temporary bond which may be treated so as to convert the temporary bond into a permanent bond, or it may be accomplished by provided two bonds, one a temporary bond and the other a permanent bond, the temporary bond holding the sheets together until after the laminated structure has been cut and formed into the proper contour, when the laminated structure is treated, so as to eliminate the use of the temporary binding material and utilize the permanent binding material in binding the sheets together. The latter of these two methods will now be described, for the purpose of illustration, it being understood that either one may be used.

Prior to assembly all but one of the sheets used in forming the laminated structure has one side gummed. These gummed sheets, together with the base sheet which is not gummed, or one of the other sheets which is not gummed, are bound into a unitary structure by a temporary binding material adhering to the gummed surface of one sheet, which gummed surface has a plurality of microscopic fissures, and to the ungummed surface of the adjacent sheet. Such a temporary binding material may be made from wax or any other suitable binding material that fails more readily than the sheet material used in the laminated structure. When portions are cut out of one or more sheets, these portions may be removed bodily, as the waxed binding material or the temporary binding material fails more easily than the material of the sheets. The inactive permanent binding material underlying the cut-out portions is removed with the cut-out portions, so as to eliminate exposed surfaces having unnecessary stickiness. After the necessary portions have been bodily removed from the laminated structure, this remaining structure is subjected to a treatment, activating the gummed surface, so as to cause this gummed surface to bind the adjacent sheets together. This gummed surface may be activated in any suitable manner, as for example, the application of moisture, the application of heat, or a combination of both.

The combination of both gives excellent results. This is accomplished by subjecting the cut laminated make-ready structure to steam under pressure. This steam supplies both moisture and heat, each of which tends to soften the gummed surface. In addition thereto, the heat causes the wax to melt and flow into the sheets and possibly pass off in part as a gas.

Referring to the drawing, a three-ply laminated structure has been shown for the purpose of illustration. A lesser or greater number of sheets or plies may be used. This laminated structure includes the top sheets 10 and 12 and the base sheet 14. As may best be seen by referring to Figure 1, the under side of sheet 10 and the under side of sheet 12 are gummed, that is, these surfaces have applied thereto a coating of paste, glue or cement, which has set and furnishes a hard surface that is temporarily inactive. This hard surface 16, before the sheets are laminated, is subjected to a cracking action, for fracturing the surface. This may be accomplished in several ways. It has been found that by passing the gummed sheet through a tortuous path formed by a series of small rollers throws sufficient curvature into the sheet so as to cause the gummed surface to crack, resulting in a number of microscopic fissures. It has been found that the formation of fissures or cracks in the gummed surface is very desirable to provide a satisfactory temporary bond between adjacent sheets. Whether the fissures provide a roughened surface permitting the wax binding material to form a bond between this roughened surface and the adjacent gummed sheet, or the wax actually passes through the gummed surface so as to contact the surface of the underlying paper, is not definitely known. In either event, the cracking of the gummed coating results in a better temporary bond existing between the laminations.

After the gummed surface has been provided with a network of fissures, the sheets are bound into a laminated structure by a temporary bonding material, as for example, by a wax-like substance, holding the sheets in a laminated structure during the process of manufacture. Such a structure has been shown in Figure 2, where the sheets 10, 12 and 14 are held together by the temporary bonds 18. This laminated structure is now ready for the production of the make-ready.

In the preferred process of producing the make-ready, an impression of the plate with which the laminated make-ready is to be used, is printed on the face of the laminated structure, as shown in Figure 3. In this figure a star has been shown. This star has the high light areas 20, the dark areas 22 and the intermediate areas 24. In reproducing this star, it is necessary to relieve the pressure of the plate upon the high light areas and preferably relieve the pressure to some extent upon the intermediate areas 24, so as to permit the full "sock" or impact of the plate to be applied upon the dark areas 22. This may be accomplished by the use of a make-ready placed upon the packing cylinder. This make-ready varies in thickness, so as to relieve the support for the sheet that is being printed, that is, the make-ready is thinner under the high light areas than it is under the intermediate areas. The make-ready is thickest under the dark areas. With this thought in mind, two layers of the laminated structure are bodily removed throughout the area corresponding to the high light areas 20, one layer is removed under the intermediate shaded areas 24, the mat remaining the full thickness under the dark areas 22, as clearly shown in Figures 4 and 5.

By referring to Figures 2, 4 and 5, it can be seen that a base sheet underlies one or more top sheets. The under sides of the top sheets carry te temporarily inactive gummed material which may be activated in any suitable manner so as for example by the application of moisture or heat or both, when this gummed material may be referred to as moisture responsive material or thermal responsive material. By cutting out and bodily removing portions of the overlying sheets, the thermal responsive binding material or the moisture responsive binding material constituting the gummed surface is also removed with the overlying portions. This eliminates any possibility of the thermal responsive binding material adhering to the equipment used in activating and transferring the bond from the temporary bond into the permanent bond. In other words, the exposed surfaces formed by the bodily removal of the cut-out portions do not have a binding material other than the temporary binding material which is usually made from a wax or similar material, which, so to speak, disappears for all practical purposes when the laminated structure is treated.

By the foregoing process it can readily be seen that the make-ready shown in Figures 4 and 5 has only one ply underlying 20a the portions to be placed in registry with the high light areas and two ply underlying 24a.

As already referred to, the bond may be transferred in numerous ways. For the purpose of illustration, the mat having had portions bodily removed therefrom, is placed upon a platen 30 covered by padding 30a and held against this platen by a ram 32 covered by padding 32a. Steam is preferably supplied to the platen 30 through an intake 34 and to the ram 32 through an intake 36. This steam, preferably under a comparatively high pressure so as to have a temperature of 500° or thereabouts, fills the cavities 38 and 40. The steam is permitted to escape into contact with the make-ready through suitable apertures or pores 42 and 44 and through the padding material 30a and 32a. Ordinary make-ready mats subjected to pressure, heat and moisture for a period of a few seconds have the bond transferred from the temporary bond to the permanent bond, so as to hold the structure in a permanent assembly, wherein the bond between the sheets is equally as strong, or stronger, than the material of the sheet. The make-ready made by this process is now ready to be placed upon the platen in registry with the plate, so that the thinnest portion of the make-ready underlies the high light areas of the plate and the thickest portion of the make-ready underlies the dark areas.

It has been found in practice that such a make-ready can be produced in a few minutes and subjected to treatment so as to transfer the bond from the temporary bond to the permanent bond. This make-ready is made, treated and mounted upon the packing cylinder in registry with the plate in much shorter time than has been possible in the past. Furthermore, this make-ready is far more accurate, in that an impression of the plate is made upon the face of the make-ready, which impression is utilized in cutting out and removing portions of the laminated structure, thereby eliminating much guesswork. By this process it is possible to produce a make-ready that registers and very accurately fits the plate, resulting in an improved cut being reproduced.

Instead of two types of bonds being used, one bond could be used which has a temporary characteristic for holding the sheets together temporarily, which bond may be subsequently treated so as to produce a permanent bond. Instead of the use of heat and the application of moisture to soften the gummed surface, the gummed surface may be activated in any other suitable manner, as for example, by the application of a chemical, the application of gases, or rays, having the characteristic of activating certain chemicals that may be utilized in the production of a make-ready.

Thus far a make-ready has been described that is used on the packing cylinder so as to relieve the pressure applied to the high light areas underlying the material receiving the impressions of the plate. This laminated structure can be used in the production of a make-ready or a matrix for face-treating electrotypes. In the production of a make-ready or matrix for use in face-treating electrotypes, the thicknesses of the make-ready are reversed, that is, the make-ready is thickest under the high light areas and thinnest under the shaded areas. The gradations of shading between the high light areas and the dark areas may overlie various thicknesses of the laminations, depending entirely upon the number of plies in the make-ready. Usually two or three plies are sufficient.

"Make-ready," as used in the appended claims, is used to designate a make-ready that is used upon the packing cylinder of a printing press or a matrix that is used on the face of a plate for face-treating the same.

Although the preferred modification of the device has been described, it will be understood that within the purview of this invention various changes may be made in the form, details, proportion and arrangement of parts which generally stated, consist in a device capable of carrying out the objects set forth, in the novel parts, combination of parts and mode of operation, as disclosed and defined in the appended claims.

Having thus described my invention, I claim:

1. The process of producing a make-ready from a laminated structure having a plurality of laminations held together with a temporary bond, said laminations being provided with inactive bonding material that may be activated so as to form a permanent bond, the steps including the method of making an impression from a plate upon the face of the laminations, bodily removing portions from some of the laminations while united so as to cause a variation in the thickness of the laminated structure according to the gradations in shading in the impression and treating the make-ready having portions cut away so as to transfer the bond from the temporary bond into the permanent bond.

2. The method of producing a make-ready from a laminated structure including a sheet of material having an adhesive material adhering to one side thereof, said adhesive material presenting a hard surface, a second sheet and a temporary bond uniting the two sheets into a laminated structure that may be separated without a failure of the sheet material but through a failure of the temporary bond, said method including the steps of bodily removing portions from one of the sheets of the laminated structure while united, and treating the remaining structure by subjecting the remaining structure to the influence of steam under pressure, so as to supply heat and moisture to the remaining structure causing the adhesive material to soften and bind the sheets together into a permanent structure.

3. The method of producing a make-ready from a laminated structure bound together by a temporary binding material and having disposed between the layers a thermal responsive binding material, the steps including the bodily removal of cut-out portions in at least one sheet of the laminated structure while united, and heating the remaining laminated structure so as to cause the bond between the sheets to be transferred to the thermal responsive binding material.

4. The process of producing a make-ready from a laminated structure including a base sheet and a top sheet, which top sheet has the under side coated with a thermal responsive binding material and a temporary binding material, causing the top sheet to temporarily adhere to the base sheet, the process including the steps of bodily removing cut-out portions of the top sheet and the thermal responsive binding material underlying the cut-out portions, heat-treating the remaining structure so as to transfer the bond from the temporary binding material to the thermal responsive binding material so as to form a permanent bond.

5. The method of producing a make-ready from a laminated structure including a base sheet and an overlying sheet, which overlying sheet has the under side coated with a moisture responsive binding material, said sheets being temporarily held together as a laminated structure by a temporary binding material, the steps including the method of bodily removing cut-out portions in the overlying sheet and with the cut-out portions the moisture responsive binding material underlying the cut-out portions, and subjecting the remaining structure to the influence of moisture so as to soften the underlying moisture responsive binding material to transfer the bond from the temporary binding material to the moisture responsive binding material producing a permanent bond between the remaining portions of the laminated sheets.

6. The method of producing a make-ready from a laminated structure having one side of some of the laminations coated with a temporarily inactive adhesive, the sheets being held together by a temporary bond, including the steps of bodily removing portions from some of the laminations while united so as to cause variations in thickness in the laminated structure, and treating the laminated structure having portions removed therefrom so as to transfer the bond from the temporary bond to the bond formed by the adhesive material holding the adjacent sheets together permanently.

HOMER L. BISHOP.